US010094389B2

(12) United States Patent
Chuong et al.

(10) Patent No.: US 10,094,389 B2
(45) Date of Patent: Oct. 9, 2018

(54) FLOW DIVERTER TO REDIRECT SECONDARY FLOW

(71) Applicant: United Technologies Corporation, Hartford, CT (US)

(72) Inventors: Conway Chuong, Manchester, CT (US); John A. Carella, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 1492 days.

(21) Appl. No.: 13/730,885

(22) Filed: Dec. 29, 2012

(65) Prior Publication Data

US 2014/0241857 A1  Aug. 28, 2014

(51) Int. Cl.
| | | |
|---|---|---|
| F04D 29/10 | (2006.01) | |
| F02C 7/28 | (2006.01) | |
| F01D 5/08 | (2006.01) | |
| F01D 11/00 | (2006.01) | |
| F01D 9/06 | (2006.01) | |

(52) U.S. Cl.
CPC ............. *F04D 29/10* (2013.01); *F01D 5/081* (2013.01); *F01D 5/085* (2013.01); *F01D 5/087* (2013.01); *F01D 9/065* (2013.01); *F01D 11/001* (2013.01); *F01D 11/005* (2013.01); *F02C 7/28* (2013.01); *F05D 2240/59* (2013.01); *Y02T 50/676* (2013.01)

(58) Field of Classification Search
CPC .... F04D 29/083; F04D 29/122; F04D 29/124; F01D 5/085; F01D 11/001; F01D 11/12; F01D 11/122; F01D 11/127; F01D 11/02; F02C 7/28; F05D 2240/55
See application file for complete search history.

(56) References Cited

U.S. PATENT DOCUMENTS

| | | | |
|---|---|---|---|
| 2,124,108 A | | 7/1938 | Grece |
| 3,565,545 A | * | 2/1971 | Bobo ................. F01D 5/081 |
| | | | 415/115 |
| 3,576,328 A | | 4/1971 | Vose |
| 3,970,319 A | | 7/1976 | Carroll et al. |
| 4,088,422 A | | 5/1978 | Martin |
| 4,114,248 A | | 9/1978 | Smith et al. |
| 4,309,145 A | | 1/1982 | Viola |
| 4,478,551 A | | 10/1984 | Honeycutt, Jr. et al. |

(Continued)

FOREIGN PATENT DOCUMENTS

| | | |
|---|---|---|
| EP | 1780380 A2 | 5/2007 |
| EP | 2415971 A2 | 2/2012 |

(Continued)

OTHER PUBLICATIONS

International Search Report and Written Opinion, dated Mar. 31, 2014, for PCT Application No. PCT/US2013/075781, 12 pages.

(Continued)

*Primary Examiner* — Gregory Anderson
*Assistant Examiner* — Julian Getachew
(74) *Attorney, Agent, or Firm* — Kinney & Lange, P.A.

(57) ABSTRACT

An assembly for a gas turbine engine includes a seal and a flow diverter. The flow diverter is disposed adjacent the seal to direct a secondary gas flow that passes across the seal away from a rotor cavity such that the secondary gas flow travels back toward a main gas flow path of the gas turbine engine.

13 Claims, 4 Drawing Sheets

(56) References Cited

U.S. PATENT DOCUMENTS

| | | | |
|---|---|---|---|
| 4,645,217 A | 2/1987 | Honeycutt, Jr. et al. | |
| 4,669,959 A * | 6/1987 | Kalogeros | F01D 5/3015 415/199.5 |
| 4,678,113 A | 7/1987 | Bridges et al. | |
| 4,738,453 A | 4/1988 | Ide | |
| 4,756,536 A | 7/1988 | Belcher | |
| 4,805,398 A * | 2/1989 | Jourdain | F01D 5/082 236/93 R |
| 4,920,742 A | 5/1990 | Nash et al. | |
| 4,987,736 A | 1/1991 | Ciokajlo et al. | |
| 4,993,918 A | 2/1991 | Myers et al. | |
| 5,031,922 A | 7/1991 | Heydrich | |
| 5,042,823 A | 8/1991 | Mackay et al. | |
| 5,071,138 A | 12/1991 | Mackay et al. | |
| 5,100,158 A | 3/1992 | Gardner | |
| 5,108,116 A | 4/1992 | Johnson et al. | |
| 5,154,048 A * | 10/1992 | Ponziani | F01D 3/04 415/107 |
| 5,157,914 A * | 10/1992 | Schwarz | F01D 5/081 415/115 |
| 5,169,159 A | 12/1992 | Pope et al. | |
| 5,174,584 A | 12/1992 | Lahrman | |
| 5,188,507 A | 2/1993 | Sweeney | |
| 5,211,541 A | 5/1993 | Fledderjohn et al. | |
| 5,224,822 A | 7/1993 | Lenahan et al. | |
| 5,236,302 A | 8/1993 | Weisgerber et al. | |
| 5,246,295 A | 9/1993 | Ide | |
| 5,273,397 A | 12/1993 | Czachor et al. | |
| 5,338,154 A | 8/1994 | Meade et al. | |
| 5,370,402 A | 12/1994 | Gardner et al. | |
| 5,385,409 A | 1/1995 | Ide | |
| 5,401,036 A | 3/1995 | Basu | |
| 5,402,636 A | 4/1995 | Mize et al. | |
| 5,474,305 A | 12/1995 | Flower | |
| 5,558,341 A | 9/1996 | McNickle et al. | |
| 5,630,703 A | 5/1997 | Hendley et al. | |
| 5,632,493 A | 5/1997 | Gardner | |
| 5,755,445 A | 5/1998 | Arora | |
| 5,911,400 A | 6/1999 | Niethammer et al. | |
| 5,961,279 A | 10/1999 | Ingistov | |
| 6,196,550 B1 | 3/2001 | Arora et al. | |
| 6,343,912 B1 | 2/2002 | Manteiga et al. | |
| 6,364,316 B1 | 4/2002 | Arora | |
| 6,439,841 B1 | 8/2002 | Bosel | |
| 6,464,453 B2 * | 10/2002 | Toborg | F01D 5/081 415/115 |
| 6,601,853 B2 | 8/2003 | Inoue | |
| 6,619,030 B1 | 9/2003 | Seda et al. | |
| 6,637,751 B2 | 10/2003 | Aksit et al. | |
| 6,638,013 B2 | 10/2003 | Nguyen et al. | |
| 6,652,229 B2 | 11/2003 | Lu | |
| 6,736,401 B2 | 5/2004 | Chung et al. | |
| 6,805,356 B2 | 10/2004 | Inoue | |
| 6,811,154 B2 | 11/2004 | Proctor et al. | |
| 6,935,631 B2 | 8/2005 | Inoue | |
| 6,983,608 B2 | 1/2006 | Allen, Jr. et al. | |
| 7,094,026 B2 | 8/2006 | Coign et al. | |
| 7,238,008 B2 | 7/2007 | Bobo et al. | |
| 7,367,567 B2 | 5/2008 | Farah et al. | |
| 7,371,044 B2 | 5/2008 | Nereim | |
| 7,631,879 B2 | 12/2009 | Diantonio | |
| 7,735,833 B2 | 6/2010 | Braun et al. | |
| 7,798,768 B2 | 9/2010 | Strain et al. | |
| 8,069,648 B2 | 12/2011 | Snyder et al. | |
| 8,083,465 B2 | 12/2011 | Herbst et al. | |
| 8,152,451 B2 | 4/2012 | Manteiga et al. | |
| 8,221,071 B2 | 7/2012 | Wojno et al. | |
| 8,245,518 B2 | 8/2012 | Durocher et al. | |
| 2002/0187046 A1 | 12/2002 | Beutin et al. | |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2005/0046113 A1 | 3/2005 | Inoue | |
| 2009/0129916 A1 | 5/2009 | Young et al. | |
| 2010/0132371 A1 | 6/2010 | Durocher et al. | |
| 2010/0132374 A1 | 6/2010 | Manteiga et al. | |
| 2010/0132377 A1 | 6/2010 | Durocher et al. | |
| 2010/0307165 A1 | 12/2010 | Wong et al. | |
| 2011/0000223 A1 | 1/2011 | Russberg | |
| 2011/0127352 A1 | 6/2011 | Fachat et al. | |
| 2011/0214433 A1 | 9/2011 | Feindel et al. | |
| 2011/0262277 A1 | 10/2011 | Sjoqvist et al. | |
| 2012/0111023 A1 | 5/2012 | Sjoqvist et al. | |

FOREIGN PATENT DOCUMENTS

| | | |
|---|---|---|
| EP | 2436879 A2 | 4/2012 |
| EP | 2469023 A1 | 6/2012 |

OTHER PUBLICATIONS

Extended European Search Report for EP Application No. 13867393.4, dated Mar. 17, 2016, 9 pages.

\* cited by examiner

US 10,094,389 B2

FLOW DIVERTER TO REDIRECT SECONDARY FLOW

BACKGROUND

The invention relates to gas turbine engines, and more particularly to a secondary gas flow within gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Seals are required in many locations within a gas turbine engine to regulate air flow to various portions of the engine. From time to time these seals may become damaged, fail or provide for inadequate sealing. This can result in the undesirable heating of engine components.

SUMMARY

An assembly for a gas turbine engine includes a seal and a flow diverter. The flow diverter is disposed adjacent the seal to direct a secondary gas flow that passes across the seal away from a rotor cavity such that the secondary gas flow travels back toward a main gas flow path of the gas turbine engine.

An assembly for a gas turbine engine includes a first component, a second component, a finger seal and a flow diverter. The first component and the second component are disposed radially inward of a main gas flow path of the gas turbine engine. The finger seal extends between the first component and the second component. The flow diverter is disposed adjacent the finger seal and is mounted to the first component. The flow diverter and the second component are arranged to form a gap therebetween to direct a secondary gas flow that passes across the finger seal along the second component.

An assembly for a gas turbine engine includes a labyrinth seal, a finger seal, and a flow diverter. The labyrinth seal has one or more lands and one or more knife edges. The finger seal is disposed adjacent the labyrinth seal. The flow diverter is positioned between the finger seal and the labyrinth seal and is spaced by a gap from the one or more lands of the labyrinth seal.

DETAILED DESCRIPTION

A flow diverter for a gas turbine engine is disposed adjacent a finger seal and between the finger seal and a labyrinth seal. The flow diverter directs a secondary air flow that passes across the finger seal through the labyrinth seal and away from a rotor cavity of the gas turbine engine. The redirected secondary air flow is eventually returned back to a main gas flow path of the gas turbine engine. The addition of the flow diverter makes interfaces between cavities within the gas turbine engine more robust and less susceptible to unwanted leakage. Additionally, the flow diverter provides for a backup seal function if the finger seal becomes damaged or loses functionality.

Figure 1:
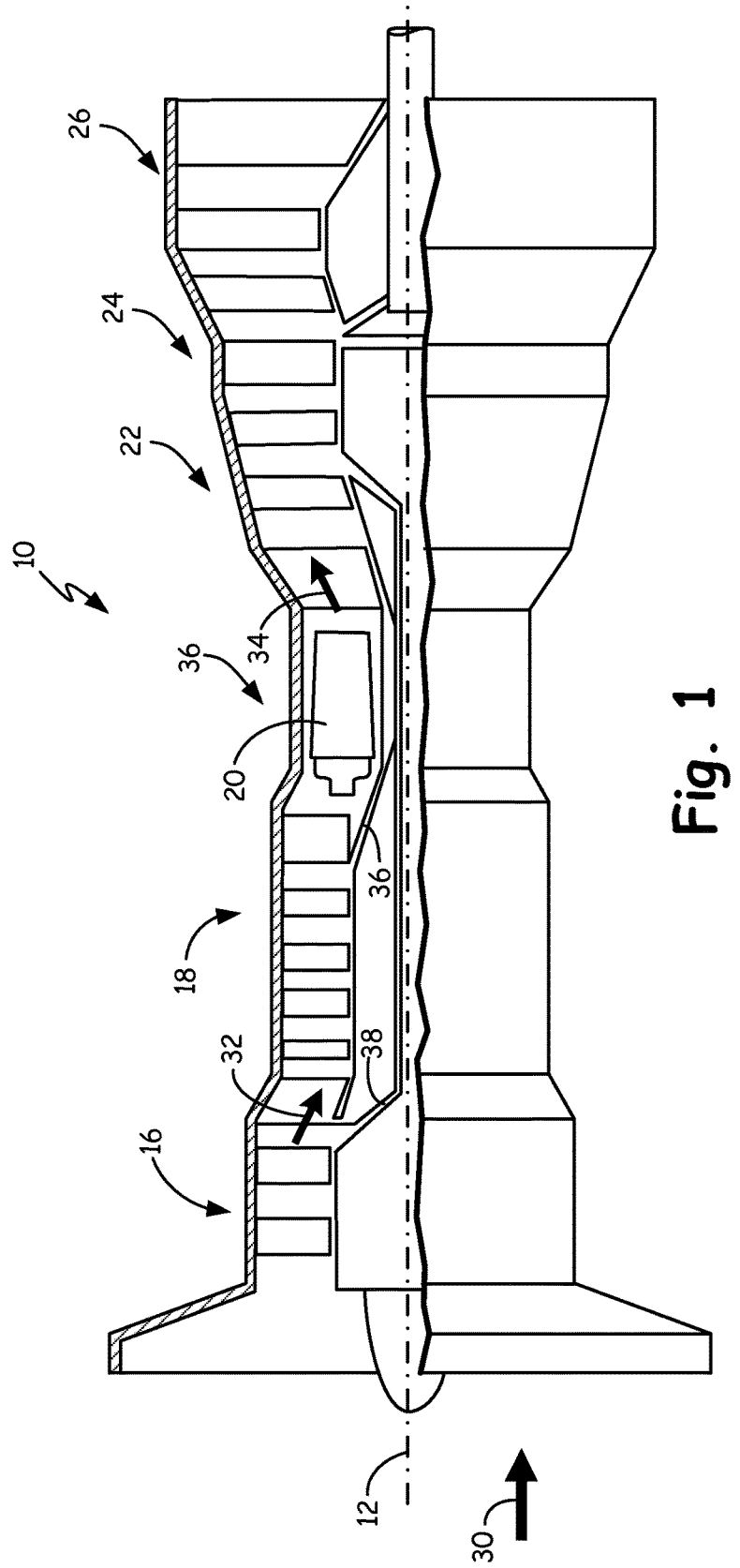
FIG. 1 is a partial cross-sectional view of an exemplary gas turbine engine.

An exemplary industrial gas turbine engine 10 is circumferentially disposed about a central, longitudinal axis or axial engine centerline axis 12 as illustrated in FIG. 1.

The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2:
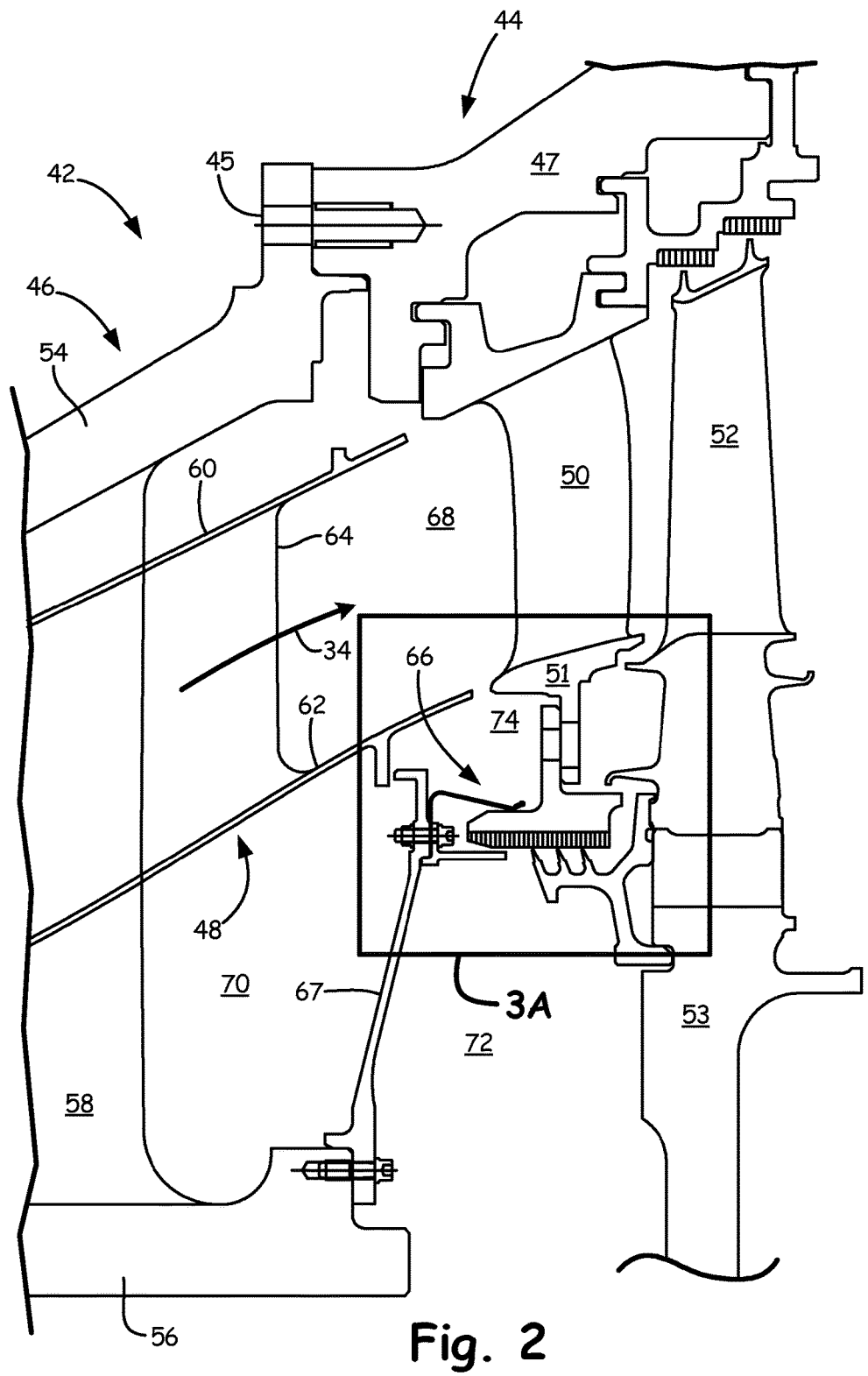
FIG. 2 is a cross-section of an assembly including a finger seal, a flow diverter, and a labyrinth seal.

FIG. 2 shows a first module 42 and a second module 44 interconnected by fasteners 45. First module 42 is only partially illustrated in FIG. 2 and includes a frame 46 and a fairing 48. Second module 44 includes an outer radial casing 47, a stator vane 50, vane platform 51, a rotor blade 52, and a rotor disk 53. Frame 46 includes an outer radial casing 54, an inner radial platform 56, and struts 58. Fairing 48 includes an outer radial platform 60, and inner radial platform 62, and strut liners 64. Assembly 66 is disposed radially inward of a main engine gas flow path 68. First module 42 additionally includes a seal support 67 and a first cavity 70. A second cavity 72 is disposed between rotor disk 53 and first module 42 and a third cavity 74 is formed between vane platform 51, seal support 67, and inner radial platform 62 of fairing 48.

First module 42 comprises a portion of gas turbine engine 10 (FIG. 1), and therefore, can form portions of compressor sections 16 and 18 or turbine sections 22 and 24. First module 42 includes various components including outer radial casing 54 frame 46 and fairing 48. Second module 44 is connected to first module 42 via fasteners 45 such that modules 42 and 44 abut along outer casings 54 and 47. Second module 44 additionally houses stator vane 50, vane platform 51, rotor blade 52, and rotor disk 53 therein. As shown in the embodiment of FIG. 2, vane 50 and blade 52 are disposed downstream of frame 46 and fairing 48 with respect to the direction of flow of combustion gases 34 along main engine gas flow path 68.

In the embodiment shown, first module 42 includes frame 46 which extends axially along and generally radially through main engine gas flow path 68. Outer radial casing 54 is connected to inner radial platform 56 by struts 58 (only one is shown in FIG. 2). Seal support 67 extends generally radially outward from inner radial platform 56 to adjacent fairing 48. Fairing 48 is affixed to frame 46 and is adapted to be disposed within frame 46 radially inward of outer radial casing 54 and radially outward of inner radial platform 56. Strut liners 64 are adapted to be disposed around struts 58.

Outer radial platform 60 of fairing 48 has a generally conical shape. Similarly, inner radial platform 62 has a generally conical shape. Inner radial platform 62 is spaced from outer radial platform 60 by strut liners 64. Outer radial platform 60, inner radial platform 62, and strut liners 64, form a portion of main engine gas flow path 68 of gas turbine engine 10 when assembled. Gases such as combustion gases 34 pass through main engine gas flow path 68 during operation.

Similar to first module 42, second module 44 includes various components such as outer radial casing 47, stator vane 50, vane platform 51, rotor blade 52, and rotor disk 53. Like vane 50, vane platform 51 is a stator component and forms an inner radial edge of main engine gas flow path 68. Vane platform 51 extends radially inward of main engine gas flow path 68 to interconnect with and support portions of assembly 66. Rotor disk 53 is disposed radially inward of main engine gas flow path 68 and is disposed adjacent portions of assembly 66.

As will be discussed subsequently, assembly 66 includes two seals and flow diverter. The first seal and flow diverter are mounted to seal support 67 of frame 46. Assembly 66 is located at a radial distance inward from inner radial platform 62 of fairing 48 as well as main engine gas flow path 68. Assembly 66 is disposed between second cavity 72 and third cavity 74. During operation, assembly 66 acts to limit a secondary gas flow from third cavity 74 to second cavity 72. Similarly, assembly 66 limits a leakage gas flow from second cavity 72 to third cavity 74. Assembly 66 allows for mixing of the secondary gas flow and leakage gas flow and releases the mixed gas flow back to main engine gas flow path 68. Assembly 66 makes interfaces between cavities 72 and 74 more robust and less susceptible to unwanted leakage between the cavities 72 and 74. Additionally, assembly 66 provides for a backup seal function in case a portion of assembly 66 becomes damaged or loses functionality. The backup seal function that assembly 66 provides is more durable and cost effective than other backup seal alternatives known in the art.

Figure 3A:
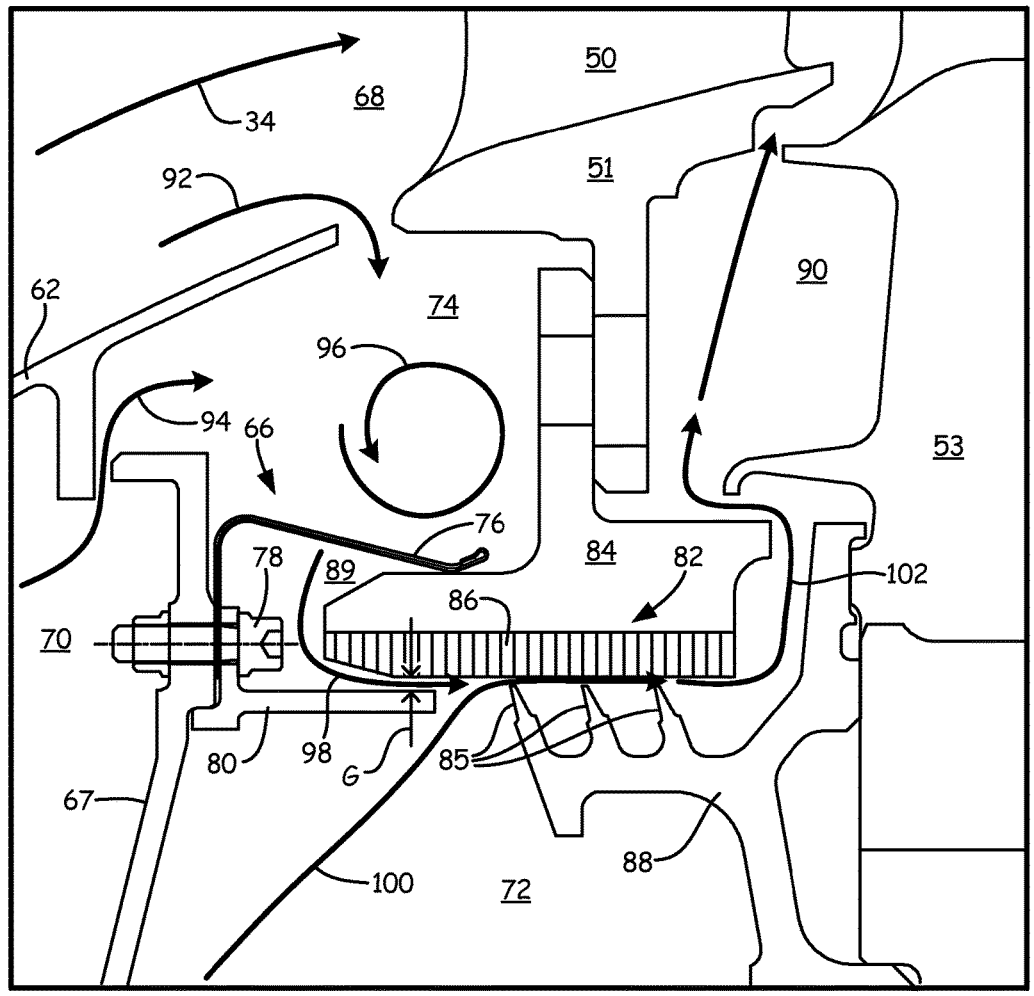
FIG. 3A is an enlarged cross-section of the assembly of FIG. 2 including the finger seal, the flow diverter, and the labyrinth seal.
Figure 3B:
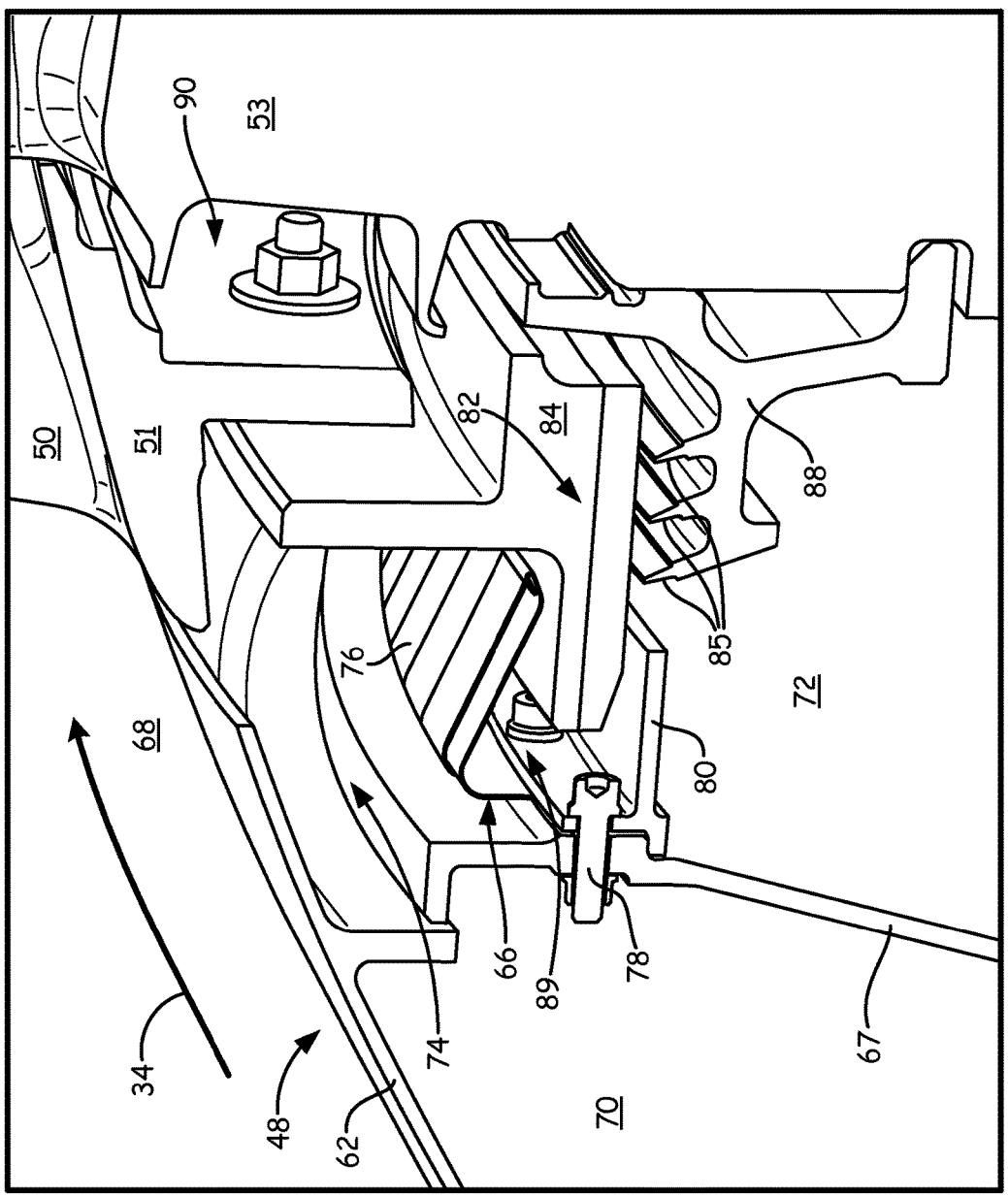
FIG. 3B is a perspective sectional view showing the finger seal, the flow diverter, and the labyrinth seal.

FIGS. 3A and 3B show a cross-section of gas turbine engine 10 (FIG. 1) with assembly 66 mounted radially inward of main engine gas flow path 68. In addition to fairing 48, vane 50, vane platform 51, rotor disk 53, inner platform 62, seal support 67, first cavity 70, second cavity 72, and third cavity 74, FIGS. 3A and 3B illustrate various components of assembly 66 including a finger seal 76, a fastener 78, a flow diverter 80, and a labyrinth seal 82. Labyrinth seal 82 includes a land 84 and knife edges 85. Land 84 includes an abradable portion 86 such as honeycomb. Knife edges 85 are formed from a mini-disk 88. A fourth cavity 89 is formed between finger seal 76 and flow diverter 80. A fifth cavity 90 is formed between rotor disk 53, assembly 66, and vane platform 51.

As shown in FIGS. 3A and 3B various secondary gas flows 92, 94, 96, 98, 100, and 102 can travel between and within cavities 70, 72, 74, 75, and 90. For the purpose of this application, secondary gas flow means any gas flow that is not traveling along main engine gas flow path 68. As combustion gases 34 travel along main engine gas flow path 68, a portion of this flow, comprising secondary gas flow 92 of ingestion gas, can pass radially inward of main engine gas flow path 68 through a gap aft of inner radial platform 62 and forward of vane platform 51. Secondary gas flow 92 enters third cavity 74 where in some instances it is mixed with secondary gas flow 94 comprised of module leakage gas from first cavity 70 to become mixed secondary gas flow 96. In some instances this mixed secondary gas flow 96 can pass across finger seal 76 as indicated by arrow 98. Secondary gas flow 98 is combined and mixed with secondary gas flow 100 (comprised of relatively cooler leakage gas from a rotor cavity such as second cavity 72). The mixed secondary gas flow 102, comprising a mixture of ingestion gas, module leakage gas and/or leakage gas from a rotor cavity, travels back to main engine gas flow path 68 through labyrinth seal 82 and cavity 90.

Finger seal 76 is mounted to seal support 67 by fastener 78. Finger seal 76 cantilevers to contact and be deflected by an outer radial surface of land 84. Flow diverter 80 is disposed adjacent finger seal 76 radially inward thereof and is also mounted to seal support 67 by fastener 78. In other embodiments, finger seal 76 and flow diverter 80 can be mounted to seal support 67 by other known means such as welds, rivets, and/or clamps.

As shown in FIG. 3B, flow diverter 80 comprises a full ring and extends away from seal support 67 toward labyrinth seal 82. Flow diverter 80 is positioned to separate fourth cavity 89 from second cavity 72. Flow diverter 80 is spaced from abradable portion 86 of land 84 by a gap G. Thus, flow diverter 80 is disposed so as not to make contact with land 84. Instead gap G allows for a flow path for secondary gas flow 98 to be directed along an inner radial surface of land 84. In this manner, flow diverter 80 acts to direct secondary gas flow 98 away from second cavity 72 and through labyrinth seal 82. Flow diverter 80 also acts to direct secondary gas flow 100 away from finger seal 76.

Labyrinth seal 82 is comprised of land 84 and knife edges 85 formed from mini-disk 88. Mini-disk 88 is mounted to rotor disk 53 such that knife edges 85 are disposed in close proximity to (or in contact with) abradable portion 86 of land 84. Mixed secondary gas flow 102 passes between land 84 and knife edges 85, around land 84 and rotor disk 53 to fifth cavity 90. From fifth cavity 90 secondary gas flow 102 travels to main engine gas flow path 68.

A flow diverter for a gas turbine engine is disposed adjacent a finger seal and between the finger seal and a labyrinth seal. The flow diverter directs a secondary air flow that passes across the finger seal through the labyrinth seal and away from a rotor cavity of the gas turbine engine. The redirected secondary air flow is eventually returned back to a main gas flow path of the gas turbine engine. The addition of the flow diverter makes interfaces between cavities within the gas turbine engine more robust and less susceptible to unwanted leakage. Additionally, the flow diverter provides for a backup seal function if the finger seal becomes damaged or loses functionality.

Discussion of Possible Embodiments

The following are non-exclusive descriptions of possible embodiments of the present invention.

An assembly for a gas turbine engine includes a seal and a flow diverter. The flow diverter is disposed adjacent the seal to direct a secondary gas flow that passes across the seal away from a rotor cavity such that the secondary gas flow travels back toward a main gas flow path of the gas turbine engine.

The assembly of the preceding paragraph can optionally include, additionally and/or alternatively, any one or more of the following features, configurations and/or additional components:

the flow diverter is positioned adjacent the finger seal to act as a backup seal in instances where the seal fails;

a labyrinth seal is disposed adjacent the flow diverter;

the flow diverter and a land of the labyrinth seal are arranged to form a gap therebetween that defines a flow path along which the secondary gas flow travels;

the seal contacts an opposing side of the land from the gap;

the flow path extends between a land and one or more knife edges of the labyrinth seal;

the flow diverter directs a leakage gas flow from the rotor cavity away from the seal;

the labyrinth seal receives the secondary gas flow that passes across the seal and mixes the secondary gas flow with the leakage gas flow from the rotor cavity;

the secondary gas flow that passes across the seal comprises a mixture of an ingestion gas flow from the main engine gas flow path and a module leakage gas flow;

the seal comprises a finger seal;

the flow diverter comprises a full ring; and the secondary gas flow is routed around one or more components of the gas turbine engine.

An assembly for a gas turbine engine includes a first component, a second component, a finger seal and a flow diverter. The first component and the second component are disposed radially inward of a main gas flow path of the gas turbine engine. The finger seal extends between the first component and the second component. The flow diverter is disposed adjacent the finger seal and is mounted to the first component. The flow diverter and the second component are arranged to form a gap therebetween to direct a secondary gas flow that passes across the finger seal along the second component.

The assembly of the preceding paragraph can optionally include, additionally and/or alternatively, any one or more of the following features, configurations and/or additional components:

the secondary gas flow is returned to a gas path of the gas turbine engine;

the second component comprises a labyrinth seal and the secondary gas flow passes between a land and one or more knife edges of the labyrinth seal;

the second component is located downstream of the first component with respect to a direction of flow along the main gas flow path and the flow diverter directs a leakage gas flow from a rotor cavity away from the finger seal; and the secondary gas flow that passes across the finger seal mixes with a leakage gas flow from the rotor cavity as both the secondary gas flow and the leakage gas flow travel across the labyrinth seal.

An assembly for a gas turbine engine includes a labyrinth seal, a finger seal, and a flow diverter. The labyrinth seal has one or more lands and one or more knife edges. The finger seal is disposed adjacent the labyrinth seal. The flow diverter is positioned between the finger seal and the labyrinth seal and is spaced by a gap from the one or more lands of the labyrinth seal.

The assembly of the preceding paragraph can optionally include, additionally and/or alternatively, any one or more of the following features, configurations and/or additional components:

a secondary gas flow that passes across the finger seal is directed between the one or more lands and the one or more knife edges of the labyrinth seal by the flow diverter; and the directed secondary gas flow mixes with a leakage gas flow from a rotor cavity across the labyrinth seal and the mixed secondary gas flow and leakage gas flow are then released back to the main gas flow path of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
   a seal;
   a flow diverter disposed adjacent the seal to direct a secondary gas flow that passes across the seal away from a rotor cavity such that the secondary gas flow travels back toward a main gas flow path of the gas turbine engine, wherein the flow diverter is positioned adjacent the seal to act as a backup seal in instances where the seal fails; and
   a labyrinth seal disposed adjacent the flow diverter, wherein the flow diverter and a land of the labyrinth seal are spaced radially to form an annular gap therebetween that defines a flow path at least partially bounded by radially-opposed surfaces of the land and the flow diverter along which the secondary gas flow travels.

2. The assembly of claim 1, wherein the seal extends through a secondary flow path to contact an opposing side of the land radially spaced from the gap.

3. The assembly of claim 1, wherein the flow path extends between the land and one or more knife edges of the labyrinth seal.

4. The assembly of claim 3, wherein the seal and the flow diverter are positioned radially inward of the main gas flow path of the gas turbine engine, and wherein the flow diverter directs a leakage gas flow from the rotor cavity away from the seal.

5. The assembly of claim 4, wherein the labyrinth seal receives the secondary gas flow that passes across the seal and mixes the secondary gas flow with the leakage gas flow from the rotor cavity.

6. The assembly of claim 1, wherein the secondary gas flow that passes across the seal comprises a mixture of an ingestion gas flow from the main gas flow path and a module leakage gas flow.

7. The assembly of claim 1, wherein the seal comprises a finger seal.

8. The assembly of claim 1, wherein the flow diverter comprises a ring.

9. The assembly of claim 1, wherein the secondary gas flow is routed around one or more components of the gas turbine engine.

10. An assembly for a gas turbine engine, comprising:
a first component;
a second component, wherein the first component and the second component are disposed radially inward of a main gas flow path of the gas turbine engine;
a finger seal mounted to and extending from the first component to contact the second component; and
a flow diverter disposed adjacent the finger seal and mounted to the first component, wherein the flow diverter and the second component are radially spaced such that radially-opposed surfaces of the flow diverter and the second component form an annular gap to direct a secondary gas flow that passes across the finger seal through the annular gap and along the second component;
wherein the second component comprises a labyrinth seal, and wherein the secondary gas flow passes between a land and one or more knife edges of the labyrinth seal.

11. The assembly of claim 10, wherein the secondary gas flow is returned to the main gas flow path of the gas turbine engine.

12. The assembly of claim 10, wherein the second component is located downstream of the first component with respect to a direction of flow along the main gas flow path, and wherein the flow diverter directs a leakage gas flow from a rotor cavity away from the finger seal.

13. The assembly of claim 12, wherein the labyrinth seal receives the secondary gas flow that passes across the finger seal and mixes the secondary gas flow with the leakage gas flow from the rotor cavity.

\* \* \* \* \*